United States Patent
Sagemueller et al.

(10) Patent No.: US 9,671,210 B2
(45) Date of Patent: Jun. 6, 2017

(54) METHOD FOR DETERMINING A CORRECTION VALUE FOR THE MONITORING OF A FLUID BEARING AND MACHINE HAVING AT LEAST ONE FLUID BEARING

(71) Applicant: Carl Zeiss Industrielle Messtechnik GmbH, Oberkochen (DE)

(72) Inventors: Rainer Sagemueller, Aalen (DE); Guenter Grupp, Boehmenkirch (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 364 days.

(21) Appl. No.: 14/328,014

(22) Filed: Jul. 10, 2014

(65) Prior Publication Data

US 2014/0317942 A1    Oct. 30, 2014

Related U.S. Application Data

(63) Continuation of application No. PCT/EP2012/051269, filed on Jan. 26, 2012.

(51) Int. Cl.
*G01B 5/00* (2006.01)
*F16C 32/06* (2006.01)
(Continued)

(52) U.S. Cl.
CPC ............ *G01B 5/008* (2013.01); *F16C 32/067* (2013.01); *F16C 32/0614* (2013.01);
(Continued)

(58) Field of Classification Search
CPC ...... G01M 1/12; G01M 1/122; G01B 21/045; G01B 21/042; G01B 5/008; G01B 5/0009;
(Continued)

(56) References Cited

U.S. PATENT DOCUMENTS 4,234,175 A  *  11/1980   Sato ..................... F16C 29/025
                                                            269/73
4,504,048 A  *   3/1985   Shiba .................... B23Q 1/385
                                                            269/71
(Continued)

FOREIGN PATENT DOCUMENTS

CN          101357443 A        2/2009
CN          102198607 A        9/2011
(Continued)

OTHER PUBLICATIONS

ISA/EP; International Search Report; mailed May 2, 2012; 2 pp.
(Continued)

*Primary Examiner* — Helen Kwok
(74) *Attorney, Agent, or Firm* — Harness, Dickey & Pierce, P.L.C.

(57) ABSTRACT

A method for ascertaining a correction value for monitoring a fluid bearing of a coordinate measuring machine or other machine tool. Also disclosed is a coordinate measuring machine having at least one fluid bearing. The machine further includes a first element and a second element which are supported against each other by means of at least one fluid bearing. In addition, a control device is provided for controlling the machine. A quantity representing a pressure in the at least one fluid bearing is ascertained as a function of a position and/or orientation of the first element relative to the second element. A correction value for a pressure in the at least one fluid bearing is determined for the position and/or orientation of the first element relative to the second element. The correction value is then stored in the control device, and subsequently used for machining or measuring a workpiece.

24 Claims, 4 Drawing Sheets

(51) Int. Cl.
*G01B 5/008* (2006.01)
*G01B 21/04* (2006.01)

(52) U.S. Cl.
CPC ........ *F16C 32/0692* (2013.01); *G01B 5/0009* (2013.01); *G01B 21/042* (2013.01)

(58) Field of Classification Search
CPC ............... G05B 19/402; G03F 7/70716; G03F 7/70141; G03F 7/70825; B23Q 1/38; B23Q 1/385; F16C 32/0614; F16C 32/067; F16C 32/0692
See application file for complete search history.

(56) References Cited

U.S. PATENT DOCUMENTS

| | | | |
|---|---|---|---|
| 4,630,942 A | 12/1986 | Tsumaki et al. | |
| 4,819,339 A | 4/1989 | Kunzmann et al. | |
| 5,301,544 A * | 4/1994 | Smith | G01M 1/122 73/65.01 |
| 5,623,853 A * | 4/1997 | Novak | G03F 7/70358 355/53 |
| 5,760,564 A * | 6/1998 | Novak | G03F 7/70716 269/55 |
| 6,142,672 A * | 11/2000 | Bently | F16C 32/0644 384/118 |
| 6,246,204 B1 * | 6/2001 | Ebihara | G03F 7/20 318/566 |
| 6,428,210 B1 * | 8/2002 | Kafai | F16C 32/0618 384/12 |
| 7,894,140 B2 * | 2/2011 | Wiener | G03F 7/70141 359/694 |

FOREIGN PATENT DOCUMENTS

| | | |
|---|---|---|
| DE | 34 19 546 A1 | 11/1985 |
| DE | 36 37 410 A1 | 5/1988 |
| DE | 100 06 876 C1 | 6/2001 |
| DE | 201 18 421 U1 | 3/2002 |
| EP | 0 866 233 A2 | 9/1998 |
| WO | WO 2010/054767 A1 | 5/2010 |

OTHER PUBLICATIONS

English translation of Chinese Examination Report with Search Report for CN 2012800717992; dated Mar. 7, 2016; 13 pp.
ISA/EP; English language translation of International Preliminary Report on Patentability (Chapter 1); issued by WIPO Jul. 29, 2014; 8 pp.

* cited by examiner

METHOD FOR DETERMINING A CORRECTION VALUE FOR THE MONITORING OF A FLUID BEARING AND MACHINE HAVING AT LEAST ONE FLUID BEARING

CROSS-REFERENCE TO RELATED APPLICATIONS

This is a Continuation application of International patent application PCT/EP2012/051269, filed Jan. 26, 2012.

BACKGROUND OF THE INVENTION

The present invention relates to methods for ascertaining a correction value for monitoring a fluid bearing of a machine for machining or measuring a workpiece, in particular a coordinate measuring machine, comprising the step of providing the machine for machining or measuring a workpiece, having a first element and a second element, the first element and the second element being supported or being able to be supported against each another by means of at least one fluid bearing, and having a control device for controlling the machine.

Moreover, the present invention relates to a machine for machining and/or measuring a workpiece, in particular a coordinate measuring machine, having a first element and a second element, the first element and the second element being supported or being able to be supported against each other by means of at least one fluid bearing, having a pressure ascertaining device for ascertaining a quantity representing a pressure in the at least one fluid bearing, and having a control device for controlling the machine.

Methods for monitoring fluid bearings and machines, in particular coordinate measuring machines, having monitored fluid bearings are known, for example from the document WO2010/054767 A1.

Coordinate measuring machines are widespread in the prior art. A coordinate measuring machine is a machine having a measuring head which can be moved relative to an object to be measured in a measuring volume. The measuring head is brought into a defined position relative to a measuring point on the object to be measured. In the case of tactile coordinate measuring machines, the measuring point is touched, for example with a feeler pin arranged on the measuring head. Spatial coordinates of the measuring point can subsequently be determined by using the known position of the measuring head in the measuring volume. If the spatial coordinates of a plurality of defined measuring points are determined on an object to be measured, geometric dimensions or even the spatial shape of the object to be measured can additionally be determined. They are used for the purpose of checking workpieces, for example within the context of quality assurance, or for ascertaining the geometry of a workpiece completely within the context of what is known as "reverse engineering". Furthermore, numerous further possible applications are conceivable.

In such coordinate measuring machines, various types of sensors can be used in order to acquire the coordinates of a workpiece to be measured. For example, sensors measuring in a tactile manner are known for this purpose, such as are marketed by the applicant, for example, under the product designation "VAST", "VAST XT" or "VAST XXT". Here, the surface of the workpiece to be measured is touched by a feeler pin, of which the coordinates in the measuring space are continuously known. Such a feeler pin can also be moved along the surface of a workpiece, so that a multitude of measuring points can be acquired at defined time intervals in such a measuring operation within the context of what is known as a "scanning method".

Furthermore, it is known to employ optical sensors, which permit acquisition of the coordinates of a workpiece without contact. One example of such an optical sensor is the optical sensor marketed by the applicant under the product designation "ViScan".

The sensors can then be used in various types of measuring structures. One example of such a measuring structure is the product "O-INSPECT" from the applicant. In a device of this type, use is made of both an optical sensor and a tactile sensor, in order to carry out various test tasks on a machine and ideally with a single clamping of a workpiece to be measured. In this way, many test tasks, for example in medical engineering, plastics engineering, electronics and precision mechanical engineering, can be carried out in a straightforward manner. Of course, beyond this, various other structures are also conceivable.

Classically, the sensor head is connected to a support system or machine frame, which supports and moves the sensor system. In the prior art, various support systems are known, for example gantry systems, upright, horizontal-arm and arm systems, all types of robot systems and, finally, self-contained CT systems in the case of sensor systems operating with x-rays. The support systems can, furthermore, have system components which permit the most flexible positioning possible of the sensor head. One example of this is the rotary swivel joint marketed by the applicant under the designation "RDS". Furthermore, various adapters can be provided in order to connect the different system components of the support system to one another and to the sensor system.

Although the present invention is preferably used in coordinate measuring machines, it can also be used in machine tools and other machines in which a machine head is to be moved with high accuracy relative to a workpiece or the like.

Both machine tools and coordinate measuring machines have a mobile working head. In a coordinate measuring machine, which will be used as an exemplary basis below, the head is frequently fixed to the lower free end of a vertically arranged quill. The quill is movable, so that the measuring head can be moved vertically in relation to a measuring table. The measuring table is used to hold an object to be measured. The quill is in turn arranged on a crossbeam of a gantry, and it can be moved on the crossbeam in a first horizontal direction by means of a carriage. The gantry can be moved together with the quill in a second horizontal direction, so that the measuring head can overall be moved in three mutually perpendicular spatial directions. Here, the quill, the carriage and the gantry form a machine frame. The maximum movement travels of the measuring head along the three directions of movement determine a measuring volume, within which the spatial coordinates can be determined on an object to be measured.

In a similar way, machine tools can be constructed. These typically have, as working head, a spindle having a tool carrier, which is moved in order to machine a workpiece. In addition to air bearings so-called hydraulic bearings, which use a liquid instead of air as fluid, are known, By means of the liquid, a lubricating film, on which two elements can move relative to each other in a sliding manner, is then formed. Within the context of the present application, the term "fluid bearing" is understood to mean both air bearings, that is to say aerostatic or aerodynamic bearings, and also hydraulic bearings, that is to say hydrostatic or hydrodynamic bearings.

Of course, it is not only the machine frame on the sensor-head side of a machine that can be provided with such bearings. A workpiece holder of a machine can for example have air bearings, for example when a workpiece is arranged on a rotary table as workpiece holder. Such a rotary table is used, for example, in the measuring device "PRISMO® Ultra with RT-AB" from the applicant.

Furthermore, the document DE 36 37 410 A1 discloses a method for determining deviations of a rotary table from an ideal rotary axis on a coordinate measuring machine. According to this method, a specific test body having a multitude of defined measuring points is laid on the rotary table, and the positions of the defined measuring points are then ascertained in various angular positions with the aid of the coordinate measuring machine. From the sets of measuring point coordinates, the runout of the rotary axis and the angular position deviation are then determined by computation. In this way, axial deviations of the rotary table, radial deviations and what are known as tumbling deviations in the movement of the rotary table can be determined.

The document DE 34 19 546 A1 discloses a method for ascertaining the position of the center of gravity of a test body, which can be constructed in a very complicated way and can have many individual parts with different specific weights, so that the position of the center of gravity cannot readily be calculated. According to this method, the test body, which can be a motor vehicle, for example, is arranged on a holding plate, which is placed on defined bearing points on the table of a coordinate measuring machine. Load cells are located at the support points of the plate. By using the positional distribution of the support points and the respectively associated support forces, the position of the center of gravity of the test body can be calculated, the initially undefined relative position of the test body in relation to the holding plate being determined with the coordinate measuring machine.

The document EP 0 866 233 A2 shows a device for functional monitoring and stoppage for air bearings, which uses a pressure measurement between the bearing surface and a base plate. A pressure monitor or pressure sensor is connected to an electrical switch, which is in turn connected to the controller of a machine.

In the case of monitored air bearings, the air pressure in the air bearing is measured directly in the bearing gap or in the volume between pressure regulator and outlet opening. The aim of bearing monitoring is normally monitoring the air bearing gap in order to detect overloading of the air bearing. The air bearing pressure and the width or height of the air bearing gap depend on one another here. Furthermore, by using the bearing pressures, for example, conclusions can be drawn about the workpiece moved by an air-mounted table. To this end, combinations of a plurality of individually monitored air bearings are frequently used, in order for example to calculate the center of gravity or the current tilting moment caused by the workpiece. This is described, for example, in the document DE 100 06 876 C1 or in the document WO 2010/054767 A1 cited at the beginning.

In the ideal case, an air bearing loaded with a specific load slides over a perfectly flat mating surface. In this case, the measured air bearing pressure would supply a constant value, which corresponds to this loading state. In reality, however, all the bearing components involved have fabrication tolerances. Air-mounted rotary tables are equipped with face plates of different weights, which can be changed by the user. If only information about the workpiece is then to be obtained, the offsets of the pressure measurement caused by the face plate weight and the fluctuations caused by the fabrication tolerances of the bearing surfaces are disruptive.

In the case of a sensor measuring the pressure in the air bearing relative to an ambient air pressure, weather-dependent fluctuations of the ambient air pressure can additionally form an interfering quantity, which can possibly be eliminated only by means of additional pressure sensor devices. As a result, however, the outlay for the structure once more increases.

BRIEF SUMMARY OF THE INVENTION

It is therefore an object of the present invention to eliminate at least one of the disadvantages described above, in particular to eliminate workpiece-independent pressure fluctuations, and to specify a method which permits improved monitoring of a fluid bearing, and an improved machine having such a fluid bearing.

Therefore, according to a first aspect of the invention, there is provided a method for ascertaining a correction value for monitoring a fluid bearing of a machine for machining or measuring a workpiece, in particular a coordinate measuring machine, comprising the following steps:

providing the machine for machining or measuring a workpiece, having a first element and a second element, the first element and the second element being supported against each another by means of at least one fluid bearing, and having a control device for controlling the machine, and ascertaining a quantity representing a pressure in the at least one fluid bearing as a function of a position and/or orientation of the first element relative to the second element, determining a correction value for a pressure in the at least one fluid bearing for the position and/or orientation of the first element relative to the second element, and storing the correction value in the control device.

According to a further aspect of the invention, there is provided a machine for machining and/or measuring a workpiece, in particular a coordinate measuring machine, having a first element and a second element, the first element and the second element being supported or being able to be supported against each other by means of at least one fluid bearing, having a pressure ascertaining device for ascertaining a quantity representing a pressure in the at least one fluid bearing, and having a control device for controlling the machine, wherein the pressure ascertaining device is designed to ascertain a quantity representing the pressure in the at least one fluid bearing as a function of a position and/or orientation of the first element relative to the second element and to output said quantity as a correction value to the control device.

According to a further aspect of the invention, there is provided a method for ascertaining a correction value for monitoring a fluid bearing of a machine for machining or measuring a workpiece, in particular a coordinate measuring machine, comprising the following steps:

providing the machine for machining or measuring a workpiece, having a first element and a second element, the first element and the second element being supported against each another by means of at least one fluid bearing, and having a control device for controlling the machine, and ascertaining a quantity representing a pressure in the at least one fluid bearing as a function of a position and/or orientation of the first element relative to the second element, determining a correction value for a pressure in the at least one fluid bearing for the position and/or orientation of the first element relative to the second element, by determining from the pressure represented by the quantity a pressure fluctuation as the correction value in a location-dependent and/or orientation-dependent manner, and storing the correction value in the control device.

Within the context of the present application, the term "fluid bearing" is to be understood to mean both air bearings, that is to say aerostatic or aerodynamic bearings, and hydraulic bearings, that is to say hydrostatic or hydrodynamic bearings. In particular, a fluid bearing can be an air bearing. If, in a fluid bearing, two real surfaces are moved relative to each other, different pressures can be measured on a pressure sensor although the loading of the fluid bearing has not changed during the movement. The measured fluid bearing pressure therefore has a location-dependent and/or orientation-dependent component. By means of the invention proposed, however, the location-dependent and/or orientation-dependent component can be eliminated by means of what is known as a "computer aided accuracy" (CAA) correction.

To this end, in the least one fluid bearing, a first bearing surface of the first element and a second bearing surface of the second element are moved relative to each other and the resultant pressures are recorded. The pressure fluctuation and a correction value for a measured pressure can then be determined in a location-dependent and/or orientation-dependent manner from the pressures and stored in the control device. Here, the determination can already take place in the control device or else in a separate data processing unit. The correction values are then used during subsequent measuring operation.

In this way it is ensured that the pressure differences then measured during the measuring operation are caused only by the workpiece and the clamping of the latter.

The CAA correction proposed can therefore eliminate all the offsets present in the system of the machine, in particular electrical offsets of the sensors used, location-dependent fluctuations of a magnetic pre-loading force that may be present, and pneumatic offsets. Furthermore, all pressure fluctuations not caused by the workpiece but by changes in the structures, for example another face plate of a rotary table, or changes in a machine frame, are eliminated.

In particular, the ascertainment step can be carried out immediately before subsequent measurement or machining of the workpiece. Then, even interference caused by weather-dependent fluctuations of the ambient air pressure can be eliminated in this way.

Dynamic effects in the fluid bearing can be disregarded under some circumstances. However, even pressure changes based on dynamic effects can be corrected by a fluid bearing being calibrated for various loadings and speeds of movement. For example, in the case of a rotary table which is loaded in such a way that there is a tilting moment, the bearing loading moves with the rotary table position. The propagation of a pressure change in the fluid bearing typically needs several tenths of a second but is dependent on the speed of rotation. Thus, under certain circumstances, there can be both load-dependent and rotational speed-dependent pressures in the fluid bearing. In this case, the calibration would have to be carried out for various load cases and with various speeds of movement in each load case. The results would then likewise be stored in the control device.

The first element and the second element can be supported against each other by means of a fluid that can be introduced between the first bearing surface of the first element and the second bearing surface of the second element. The fluid bearing per se is thus provided by the mutually opposite first bearing surface and second bearing surface, between which a fluid can be introduced. The fluid is in particular air but can also be another gas. The fluid is put in or injected between the first bearing surface and the second bearing surface under a certain pressure. As a result, the bearing gap is generated or produced. The fluid can then flow through the bearing gap. In this way, the fluid bearing between the first element and the second element is provided. During operation of the machine, the fluid bearing is thus provided by the bearing gap between the first bearing surface and the second bearing surface through which the fluid or the air flows. The fluid bearing thus has the first bearing surface of the first element and the second bearing surface of the second element and a fluid or air stream that can be introduced or a fluid that can be introduced or air that can be introduced between the first bearing surface and the second bearing surface, which fluid or air supports the first bearing surface and the second bearing surface against each other. The pressure in a fluid bearing can thus be understood in particular to mean the static pressure of the air between the first bearing surface and the second bearing surface.

In one refinement of the invention, provision can be made for the ascertainment step to be carried out for a multitude of positions and/or orientations of the first element relative to the second element.

In particular, the ascertainment and determination steps and in particular, also the storage step, can be for a plurality of positions and/or orientations of the first element relative to the second element.

In particular provision can then be made for the multitude of positions and/or orientations to cover the entire range of a relative movement between the first element and the second element in discrete steps.

Consequently, the entire movement range which a first bearing surface of the first element and a second bearing surface of the second element can carry out relative to each other is run through step by step or stage by stage and, for each step or each stage, a pressure is ascertained and a correction value is determined. Here, the steps or stages can be chosen as finely as desired. It goes without saying that, in the case of a linear movement, specific distances between individual steps can be predefined, for example 5 mm, 1 cm or 5 cm. In the case of rotational movements, for example, angles can be predefined, for example 0.5°, 1°, 2°. In particular in the case of rotary tables which, following a complete revolution, reach the same relative position of the first bearing surface and the second bearing surface relative to each other again, a high resolution of the correction values can be selected and maintained over the entire movement range. A range between the individual correction values determined in the discrete steps can be determined by means of an interpolation. For example, a linear interpolation can be carried out. It is also possible, for example, for a polynomial approach to be chosen, in order to find a function for the correction values over a plurality of correction values determined in the discrete steps.

In principle, instead of a movement in discrete steps, a continuous movement can also be carried out. Consequently, the first bearing surface and the second bearing surface are then moved continuously relative to each other, at least during the ascertainment step. Thus, a type of "scanning process" is provided during the ascertainment. In the process, it is possible for inaccuracies to occur, since the pneumatic compensating processes do not have sufficient time to establish a stable state. To this end, provision can be made, depending on a speed of the continuous movement, to provide an empirically ascertained correction value, for example. By using the correction value, the quantities representing a pressure that are ascertained during a continuous movement can then be corrected. The latter then correspond in their accuracy to the quantities ascertained by means of a movement in discrete steps. Furthermore, it is also possible to form an average from a plurality of measured values or quantities ascertained over a specific range.

Provision can be made for the ascertainment step to be carried out first for each position and/or orientation of the first element relative to the second element. For the dataset ascertained in this way, a determination step for determining all the correction values can then be carried out once, said correction values then being stored in a storage step. However, provision can also be made for the steps of both the ascertainment and also the determination to be carried out first for each position and/or orientation of the first element relative to the second. Thus, following each ascertainment step, the corresponding correction value is determined immediately. All the correction values are then stored jointly in the storage step. Finally, provision can also be made for the steps of ascertainment, determination and storage to be carried out for each position and/or orientation of the first element relative to the second element. In this case, all the steps are carried out in each position and/or orientation of the first element relative to the second element, and the correction values are stored successively.

In one refinement of the invention, provision can be made for the first element and the second element each to be an element of a workpiece holder for holding a workpiece. In particular, provision can be made for the first element to be a rotary table or a rotor of a rotary table and for the second element to be a base on which the rotary table is supported or a stator of a rotary table.

Of course, it is also possible for the first element and the second element to be elements of the rotary table. For example, the first element can be a rotor of the rotary table and the second element a stator of the rotary table. The base can likewise form an element of a machine frame, on which a working head of the machine is arranged.

In this way, a fluid bearing or air bearing arranged on the workpiece side, so to speak, in particular a mounting of a rotary table, can be monitored in an improved manner by means of the proposed invention.

In one refinement of the invention, provision can be made for the machine to have multiple fluid bearings, ascertainment, determination and storage steps being carried out for each of the fluid bearings.

In this way, improved monitoring can be provided on a multitude of fluid bearings. This makes it possible to utilize the possible advantages as a result of monitoring a multitude of fluid bearings. For example, a tilting moment caused by the workpiece can thus be monitored better or else a position of the center of gravity of the workpiece arranged on the workpiece holder can be ascertained.

In a further refinement, provision can be made for the first element and the second element each to be an element of a machine frame of the machine, a working head of the machine being arranged on the machine frame.

The working head, for example in the case of a coordinate measuring machine, can be a sensor head which, for example, has an optical sensor and/or a tactile sensor for measuring the workpiece. Furthermore, for example in the case of a machine tool, the working head can also be a tool head which carries a tool, for example a turning, milling or cutting tool.

By means of the proposed invention, it is thus also possible to monitor better the fluid mounting or air mounting of a machine frame of a machine that carries a working head. In particular, bearing loading and possible overloading of the fluid bearing, in which the first bearing surface and the second bearing surface come into contact with each other, can thus be ascertained precisely. This is important in particular in order to initiate an emergency stoppage of the machine as quickly as possible in the event of overloading of the fluid bearing, and thus to avoid damage to the fluid bearing.

In a further refinement of the invention, provision can be made that, before each ascertainment step, a step of moving the first element and the second element relative to each other is carried out in such a way that a position and/or an orientation of the first element relative to the second element changes.

In this way, the relative movement range of the first bearing surface of the first element and of the second bearing surface of the second element can be run through, in particular successively or continuously. The first bearing surface and the second bearing surface are thus firstly moved by a certain amount relative to each other and then remain briefly in this position. The relative position of the first bearing surface relative to the second bearing surface is ascertained and, likewise, the quantity representing a pressure in the bearing. The determination and storage steps are then carried out. The first bearing surface and the second bearing surface are then once more moved by a certain amount relative to each other, and the ascertainment, determination and storage steps are carried out again.

In particular, the ascertainment and determination steps and in particular the storage step, and also in particular the movement step, can thus be carried out repeatedly in this way until an entire range of movement of the first element and of the second element relative to each other has been run through.

Provision can thus be made for the movement of the first bearing surface relative to the second bearing surface to be carried out step by step, the position and/or the orientation of the first element and the second element relative to each other changing during the ascertainment step, in particular also during the determination step and/or the storage step.

Furthermore, provision can be made for the movement of the first element relative to the second element to be carried out continuously, the position and/or the orientation of the first element and the second element relative to each other changing during the ascertainment step, in particular also during the determination step and/or the storage step.

In one refinement of the invention, provision can be made for the ascertainment, determination and storage steps to be carried out without the workpiece being arranged on the workpiece holder.

In this way, it is possible to ensure that pressure differences caused by the workpiece can be detected during the monitoring. This is advantageous in particular for further evaluations, such as for example the acting tilting moment or the position of the center of gravity of the workpiece.

In a further refinement of the method, provision can be made for the method further to comprise the following steps:
  arranging the workpiece on a workpiece holder of the
    machine, and machining or measuring the workpiece while taking the correction value into account.

In this way, it is possible to carry out the machining or measuring of the workpiece with improved fluid bearing monitoring. The step of arranging the workpiece on a workpiece holder of the machine can be carried out immediately after the providing step but can also be carried out immediately after the storage step.

In one refinement of the invention, provision can be made for the ascertainment step to be carried out by the pressure being ascertained directly by means of a pressure sensor.

In particular, provision can be made for the pressure to be ascertained directly in the fluid bearing, which means in the fluid bearing gap. However, provision can also be made for the pressure to be ascertained in any of the air supply lines leading to the fluid bearing.

By means of the direct ascertainment of the pressure, the pressure in the fluid bearing can be determined directly without having to carry out conversions, during which accuracy of the ascertainment of the pressure can decrease.

In particular, the step of machining or measuring the workpiece while taking the correction value into account can be carried out at a short time interval following the storage step.

In this way, the advantage of also being able to calibrate weather-dependent air pressure fluctuations is provided.

In a further refinement of the method, provision can be made for the ascertainment step to be carried out by the pressure being ascertained indirectly via a deformation of the first and/or of the second element, detected by means of at least one strain gauge or at least one load cell, or by the pressure being ascertained indirectly via a fluid bearing gap width between the first element and the second element, detected by means of a distance sensor.

By means of the indirect detection of the pressure, for example, the necessity to perform temperature-dependent corrections on account of a pressure sensor measuring relatively can be avoided. The indirect ascertainment of the pressure can thus be more robust as compared with the direct ascertainment. The use of distance sensors instead of pressure sensors can, furthermore, be very advantageous, since the pressure differences to be measured can be very small. Distance sensors are able to measure much more accurately and with higher resolution, so that this indirect ascertainment of a pressure or pressure difference can be carried out more accurately.

In a further refinement of the method, provision can be made for the ascertainment step to be carried out in that, by using predetermined geometric data about the first element and the second element, an expected pressure or pressure difference or an expected pressure change in the fluid bearing is calculated or ascertained as a function of a position and/or orientation of the first element relative to the second element.

This ascertainment step can be carried out, for example, in a data processing device. This data processing device can be provided in the control device of the machine.

The necessary geometric data about the first element and the second element can be available, for example, following quality control in fabrication, in which the first element and the second element have been measured. The actual geometries of the components are therefore known, and therefore their deviations from their ideal predefined intended geometric shape. By using the then known shape defects, the pressure fluctuations to be expected in the fluid bearing can be calculated via mathematical models known to the average person skilled in the art. Thus, the ascertainment step can be carried out only in a data processing device. Thus, a time period needed for the proposed CAA offset calibration could be reduced.

Provision can also be made for a relationship between the geometric data and the expected pressure or pressure difference to be ascertained empirically in advance in a laboratory trial. By using the relationship obtained in this way, the parameters of a mathematical correction model can also be determined. The results of such a laboratory trial or the mathematical correction model can then be stored in the data processing device or the control device. During operation, the pressures or pressure differences ascertained within the context of the laboratory trial can then be read out on the basis of the geometric data. By using said pressures or pressure differences, the correction value can then be determined. The correction values can also be ascertained, for example, with the aid of the mathematical model, the parameters of which have been determined on the basis of the geometric data and the laboratory trials previously carried out.

In all the refinements of the method, provision can be made for the fluid bearing to be an air bearing.

Accordingly, in one refinement of the machine, provision can be made for the first element to be a rotary table and for the second element to be a base on which the rotary table is supported.

Here, too, a fluid bearing or air bearing arranged on the workpiece side can thus be monitored better.

Therefore, provision can in particular be made for the machine to have multiple fluid bearings, which in particular are arranged in the form of a ring with respectively equal distances from adjacent fluid bearings.

For example, provision can be made for a rotary table to be arranged on six fluid bearings, which are each arranged with an offset of 60° relative to one another.

Furthermore, provision can be made for the pressure ascertaining device to have at least one sensor device respectively assigned to a fluid bearing, the sensor device detecting a quantity representing a pressure in the respective fluid bearing.

The at least one sensor device can in each case be a pressure sensor or at least one strain gauge or at least one load cell or a distance sensor for detecting a fluid bearing gap width between the first element and the second element.

As has already been explained above, as necessitated by the situation, it is thus advantageously possible to carry out a direct or immediate and also an indirect or oblique ascertainment of the pressure in the fluid bearing. Of course, provision can also be made for various examples of the types of sensors proposed to be combined with one another, for example a pressure sensor which detects the pressure in the bearing directly and one of the proposed indirect types of sensors, that is to say a strain gauge, a load cell and/or a distance sensor. In this way, the pressure in the fluid bearing can be detected in a redundant manner and the accuracy can thus be increased.

In a further refinement, provision can be made for the pressure ascertaining device to be a data processing device, which is equipped in such a way that, by using geometric data, it ascertains the pressure to be expected or the pressure change to be expected in the fluid bearing.

Provision can thus also be made in the machine that, by using previously known geometric data about the first element and about the second element, a pressure fluctuation to be expected in the fluid bearing is calculated by using a mathematical model known to the average person skilled in the art.

In all the refinements, the distance sensors proposed for detecting the width of a fluid bearing gap can be any desired distance sensors. For example, sensors measuring optically are conceivable.

In all the refinements of the machine, provision can be made for the fluid bearing to be an air bearing.

It goes without saying that the features mentioned above and those still to be explained below can be used not only in the respectively specified combination but also in other combinations or on their own without departing from the scope of the present invention.

BRIEF DESCRIPTION OF THE SEVERAL VIEWS OF THE DRAWING

Exemplary embodiments of the invention are illustrated in the drawing and will be explained in more detail in the following description. In the drawing.

DETAILED DESCRIPTION OF THE INVENTION

Figure 1:
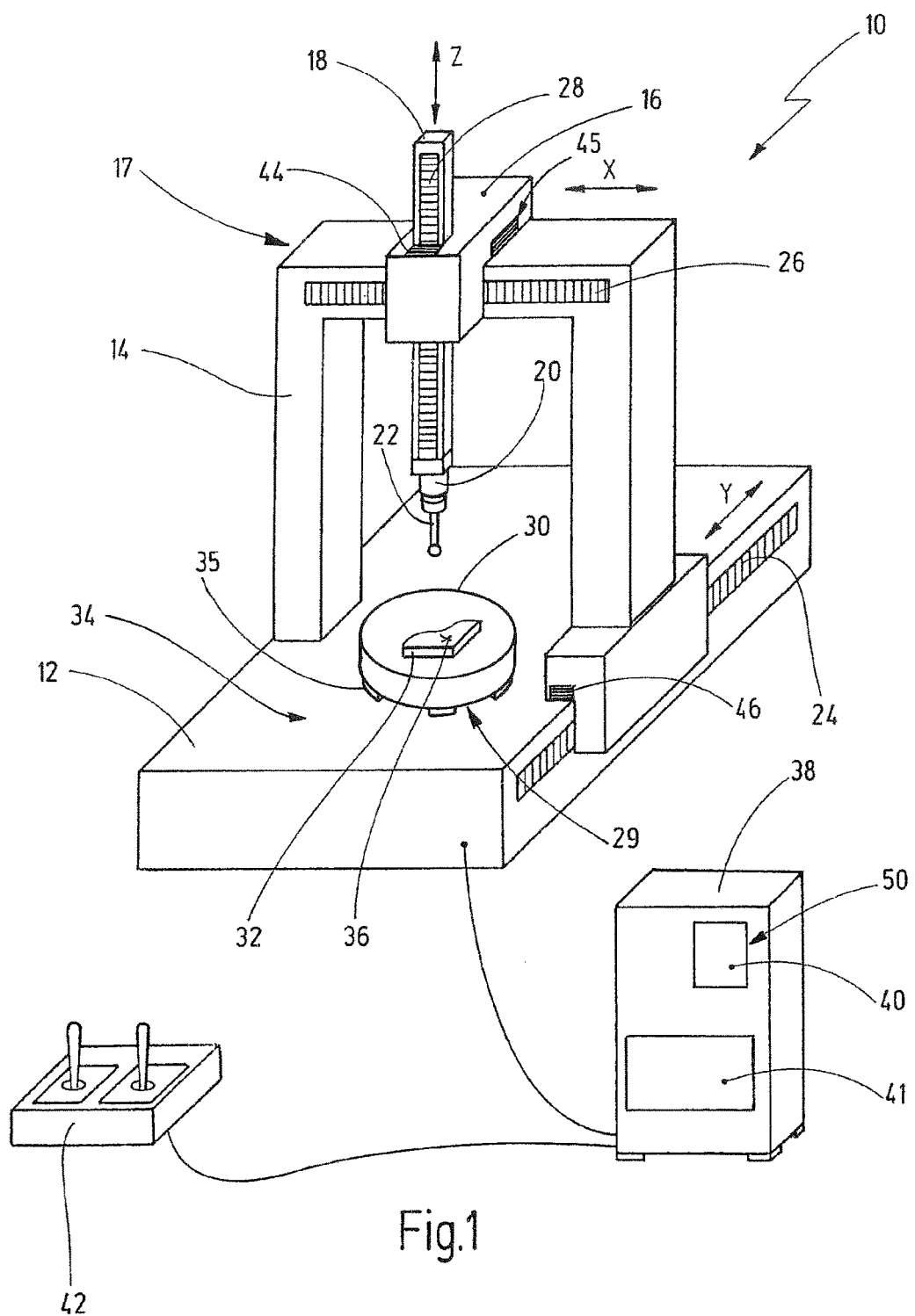
FIG. 1 shows a simplified illustration of a machine according to an exemplary embodiment of the present invention.

FIG. 1 illustrates an exemplary embodiment of the novel apparatus in the form of a machine 10, which is constructed as a coordinate measuring machine. However, the invention is not restricted to coordinate measuring machines in the narrow sense, that is to say to measuring devices with which spatial coordinates of measurement points on a workpiece are determined with the aid of a suitable sensor device. The invention can equally be used in other types of measuring devices in which the workpiece is arranged on a workpiece holder, and wherein the workpiece holder or a machine frame of the machine is arranged in at least one separate fluid bearing.

The coordinate measuring machine 10 has a base 12, on which a gantry 14 is arranged here. The gantry 14 can be moved in a first longitudinal direction, which is usually designated the Y-axis. Arranged on the upper crossbeam of the gantry 14 is a carriage 16, which can be moved along a second longitudinal axis. This second longitudinal axis is usually designated the X-axis. Arranged on the carriage 16 is a quill 18, which can be moved along a third longitudinal axis. The third longitudinal axis is normally designated the Z-axis. Typically, the three longitudinal axes X, Y and Z are perpendicular to one another. The gantry 14, the carriage 16 and the quill 18 form a machine frame 17.

Arranged at the lower free end of the quill 18 is a sensing head 20 having a feeler pin 22. The sensing head 20 can be moved along the three axes X, Y, Z within a measuring volume with the aid of the gantry 14, the carriage 16 and the quill 18. The sensing head 20 and the feeler pin 22 together form a first sensor device in the sense of the present invention. With the aid of the first sensor device, a measuring point on a workpiece can be identified by the measuring point being sensed with the free tip of the feeler pin 22. The reference numbers 24, 26, 28 designate three scales, by using which the spatial position or spatial coordinates of a sensed measuring point along the three axes X, Y, Z can be determined. By sensing multiple measuring points and determining corresponding spatial coordinates, dimensions (length of an edge, diameter of a hole, etc) or even the spatial shape of a workpiece can be determined.

The coordinate measuring machine illustrated in FIG. 1 and having a tactile sensing head is a preferred exemplary embodiment. However, the invention is not restricted thereto and can be used equally in a measuring device of post and beam construction and/or in measuring devices having non-contact sensor devices, for example in measuring devices having optical sensors.

Furthermore, the machine 10 has a workpiece holder 29. Reference number 30 designates a rotary table, on which a workpiece 32 is arranged here. The rotary table 30 is supported on the base 12 via a fluid bearing system 34. The fluid bearing system 34 has a plurality of fluid bearings 35, which are each formed as an air pad between the base 12 and the fluid-supported rotary table 30. In a particularly preferred exemplary embodiment, the rotary table 30 is a round rotary table (cf. FIG. 2), which is supported on the base 12 via seven fluid bearings 35, the seven fluid bearings being distributed uniformly along the outer circumference on the underside of the rotary table 30. In particular, the fluid bearing system 34 can be an air bearing system. In particular, the fluid bearing 35 can be an air bearing. The fluid is then a gas. The gas is air. In the case of a hydraulic bearing or a hydraulic bearing system, the fluid is a liquid, for example an oil.

The reference number 36 designates a spatial position which, here, represents the center of gravity of the rotary table 30 with the workpiece 32 arranged thereon. As can be seen from FIG. 1, this center of gravity can be located apart from the circular center or center of the rotary table 30 on account of the workpiece 32, which is the case in particular when the mass center of gravity of the workpiece 32 is located radially outside the circular center of the rotary table 30.

Reference number 38 designates a control device which, firstly, is used to control the movements of the coordinate measuring machine 10, including the movement of the sensing head 20 and of the rotary table 30, via drives, not illustrated here. Secondly, the evaluation and control unit 38 is used to determine the spatial coordinates of a measuring point on the workpiece 32, sensed by using the feeler pin 22, by using the measured values from the scales 24, 26, 28 and measured quantities derived therefrom, such as for example the length of an edge, the depth or the diameter of a hole, etc.

The control device 38 has a data processing device 40, on which an evaluation and control program (not illustrated here) is executed. In preferred exemplary embodiments, the control device 38 further has a display device 41, in order to display measuring results to a user, and/or a graphic operator interface for the administration of the machine. To this end, an operating device 42, via which a user can enter user inputs into the machine, is provided, in order to set up and/or to control the machine as desired. The operating device 42 can be provided separately or else also as part of the control device 38. Of course, in particular cable-free communication of the operating device 42 and control device 38 with the machine 10 can also be set up.

Besides the fluid bearing 35 of the fluid bearing system 34 which is used to support the workpiece holder 29, it is of course also possible, additionally or alternatively, to provide further locations in the machine 10 at which a fluid bearing 35 with improved monitoring is arranged. For example, such a fluid bearing can also be used in the machine frame 17 which carries the working head 20. Thus, for example, the quill 18 can be supported with respect to the carriage 16 by means of a fluid bearing 44, shown schematically. Furthermore, the carriage 16 can of course be supported relative to the gantry 18 by means of a fluid bearing 45, illustrated schematically. Furthermore, the gantry 18 can of course also be supported on the base 12 by means of a fluid bearing 46, illustrated schematically.

Figure 2:
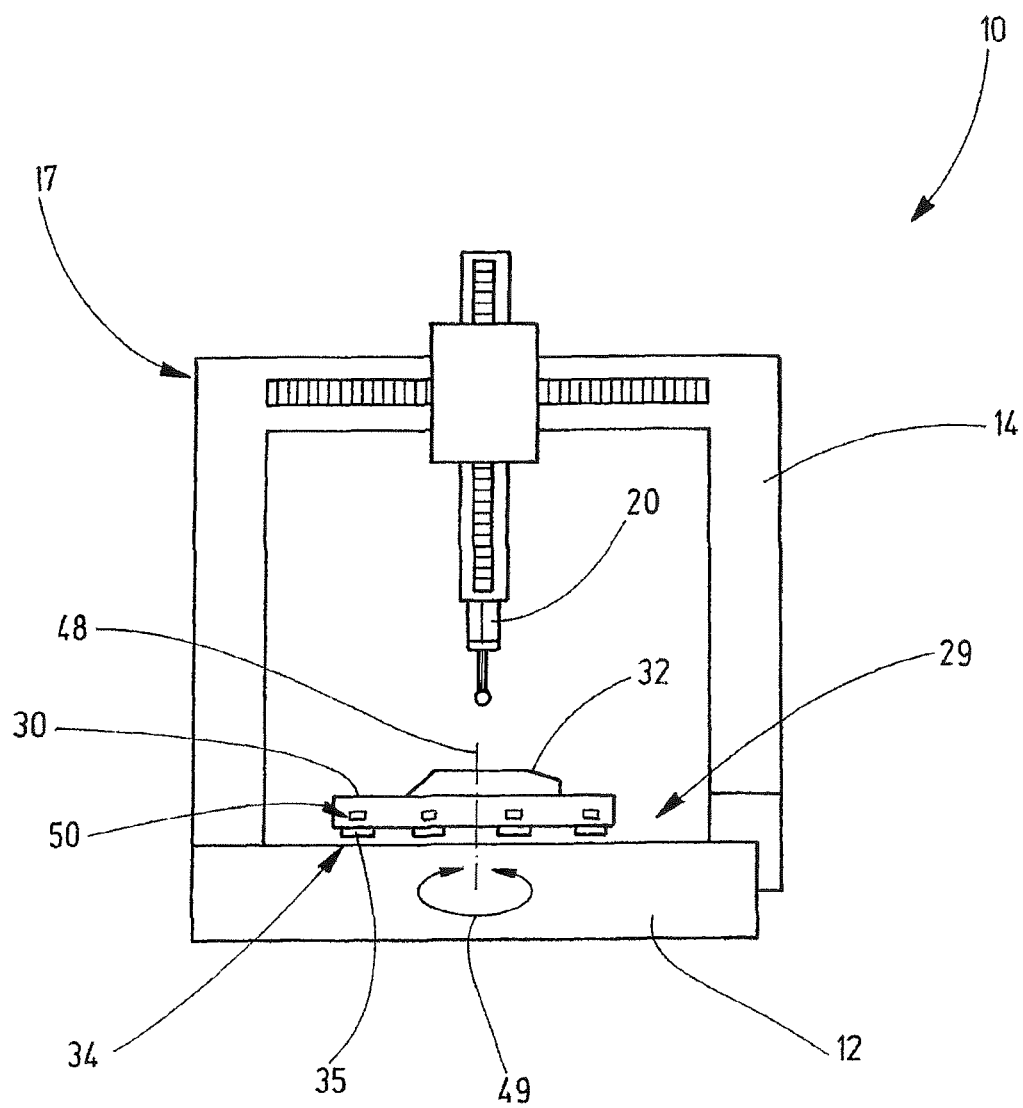
FIG. 2 shows the coordinate measuring machine from FIG. 2 in a view parallel to the Y-axis.

In the side view according to FIG. 2, the axis of rotation 48 of the rotatable rotary table 30 is illustrated. The rotary table 30 can be rotated around the axis of rotation 48 in the direction of the arrow 49, the rotary table 30 sliding with the aid of a fluid bearing system 34 which comprises the multitude of fluid bearings 35. The reference number 50 designates a pressure ascertaining device which, for example, can be formed as a pressure sensor. The machine 10 has a multitude of pressure ascertaining devices 50, in order to determine the individual fluid pressure on each fluid bearing 35. The fluid pressures determined with the aid of the pressure ascertaining devices 50 represent the individual bearing loading on the respectively associated fluid bearing 35.

In particular, in the embodiment illustrated, provision can be made for six or seven fluid bearings 35, which form the fluid bearing system 34, to be provided. The fluid bearings 35 are in particular arranged in the form of a ring between the rotary table 30 and the base 12. In this case, the fluid bearings 35 have equal spaces between them. In particular, they can each be arranged at equal angular intervals with respect to the axis of rotation 48. In the case of a total of six fluid bearings 35, an angle of 60° can in each case be formed between them.

Figure 3:
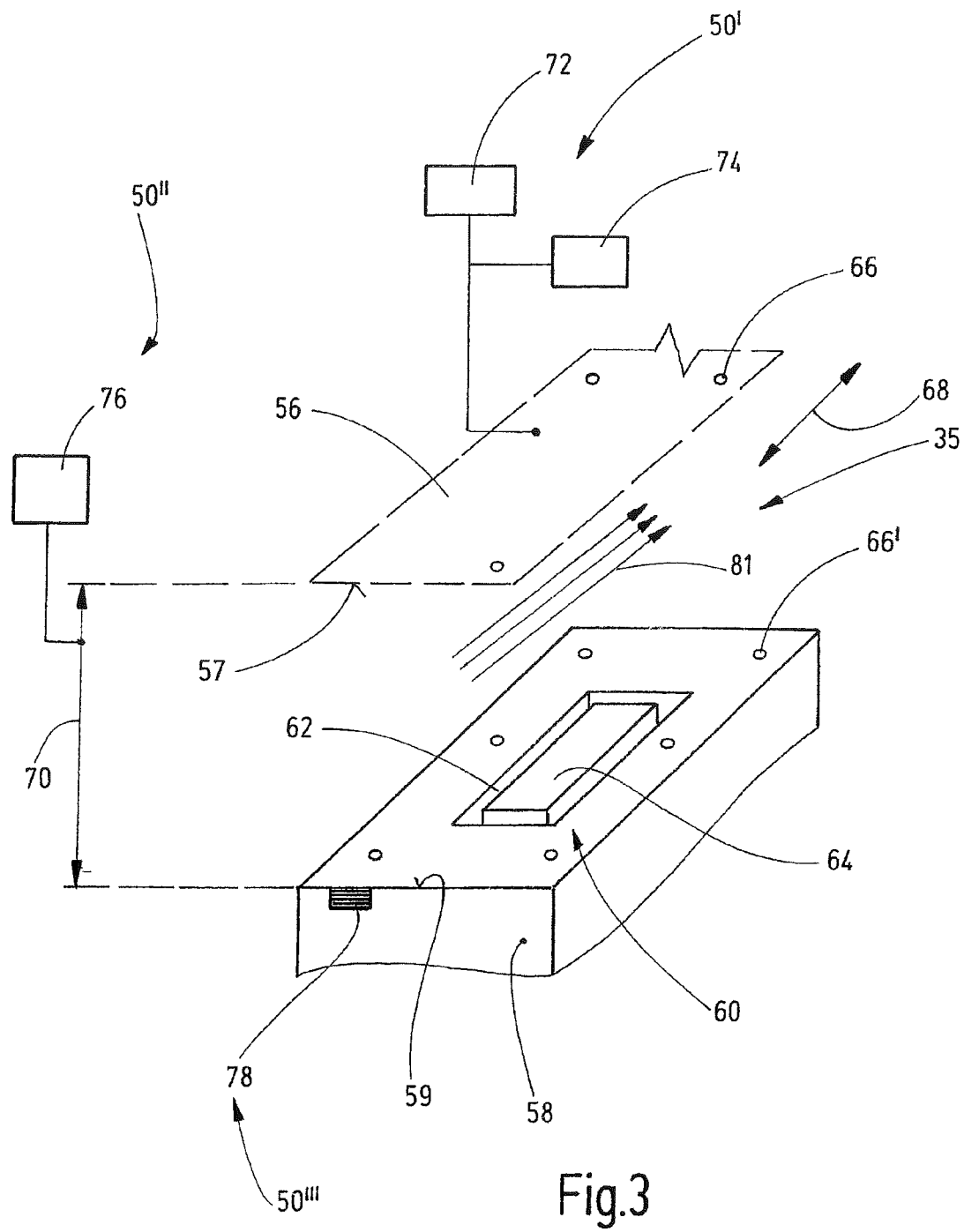
FIG. 3 shows a schematic view of a possible embodiment of an air bearing as can be used in the machine illustrated in FIGS. 1 and 2.

FIG. 3 shows an embodiment of a fluid bearing 35 as can be used in the machine in FIG. 1. In this case, a first element 56 and a second element 58 can be supported against each other by means of the fluid bearing 35.

To this end, in the embodiment illustrated, in the second element 58 there can be formed a recess 62, in which there is arranged a magnet, which is formed as a permanent magnet. The magnet 64 can be, for example, a permanent magnet or an electromagnet. Here, the recess 62 is formed in a bearing surface 59 of the second element 58. In this way, it is possible to set up what is known as a preloaded fluid bearing 35. However, the fluid bearing 35 does not necessarily have to be designed to be preloaded. Of course, the recesses 62 and the magnet 64 can also be arranged in the first element 56. The arrangement in the second element 58 is to be understood merely by way of example.

In the fluid bearing 35, a first bearing surface 57 of the first element 56 and a second bearing surface 59 of the second element 58 are located opposite each other and form between themselves a fluid bearing gap 70, which is designated by the reference number 70. If the fluid bearing 35 is an air bearing, the air flowing between the first bearing surface 57 and the second bearing surface 59 accordingly forms an air bearing gap between the first bearing surface 57 and the second bearing surface 59. The first element 56 is illustrated schematically by dashed lines. Furthermore, the dimension of the spacing of the first bearing surface 57 and the second bearing surface 59 is to be understood merely by way of example and chosen for illustrative purposes. The first element 56 and the second element 58 can be supported against each other by means of a fluid 81, for example air, that can be introduced between the first bearing surface 57 and the second bearing surface 59. The fluid bearing 35 per se is thus provided by the mutually opposite first bearing surface 57 and the second bearing surface 59, between which the fluid 81 can be introduced. The fluid 81 is put in or injected between the first bearing surface 57 and the second bearing surface 59, under a certain pressure. The fluid 81 then flows through the fluid bearing gap 70. In this way, the fluid bearing 35 between the first element 56 and second element 58 is provided. During operation of the machine 10, the fluid bearing 35 is thus provided by the fluid bearing gap 70 between the first bearing surface 57 or the first element 56 and the second bearing surface 59 or the second element 58, through which gap the fluid 81 flows.

Fluid inlet openings 66, 66', through which the fluid 81 is injected or introduced into the fluid bearing gap 70, can be provided in the first bearing surface 57 and/or the second bearing surface 59.

In this way, it is possible for the first element 56 and the second element 58 to execute a sliding movement relative to each other, as indicated by a double arrow 68. Here, the movement can be carried out without wear, the elements 56, 58 being supported and guided safely on each other.

As the movement is executed, provision can be made for the second element 58 to remain stationary, that is to say not move absolutely, and for the first element 56 to move, which means to move both absolutely and also relative to the second element 58. Of course, this can also be carried out the other way round, which means that the second element 58 moves and the first element 56 remains stationary. Of course, provision can moreover also be made for both the first element 56 and the second element 58 to execute a movement in an absolute coordinate system and, moreover, also to move relative to each other.

The various pressure ascertaining devices are identified by the reference numbers 50, 50' and 50" and also 50''' in FIGS. 1, 2 and 3. In principle, provision can be made for the pressure in the fluid bearing 35 to be ascertained directly by means of a pressure sensor 78. Here, the pressure sensor 78 can determine the pressure in the fluid bearing 35 absolutely or relative to its ambient pressure. This can be done directly in the fluid bearing gap 70 between the first bearing surface 57 and the second bearing surface 59 but, for example, can also be carried out in a supply line, which leads the fluid 81 that is under pressure to one of the fluid inlet openings 66, 66'.

Furthermore, provision can be made for the pressure prevailing in the fluid bearing 35 or for a pressure change to be detected by using deformations of the first element 56 and/or of the second element 58. In particular, this can be carried out with a knowledge of an intended pressure prevailing in the fluid bearing 35 without the detected deformation. It is then possible to draw conclusions about a change in the intended pressure from the deformation. To this end, for example, a load cell 72 and/or at least one strain gauge 74, which are fitted to the first element 56, can be provided. Of course, they can also be connected alternatively or additionally to the second element 58. It is also possible for a distance sensor 76, which detects a fluid bearing gap width 70, to be provided. This sensor can be configured, for example, as an optical sensor. The sensors 72, 74, 76, 78 can be arranged in the first element 56 and/or in the second element 58, for example.

Lastly, it is also possible for the pressure expected in the fluid bearing 35 to be calculated by a data processing device 40. This can be done by using a mathematical model, known to the average person skilled in the art, on the basis of geometric data about the first element 56 and the second element 58. The pressure in the fluid bearing 35 can thus be measured actually and directly, for example by means of the pressure sensor 78, actually and indirectly, for example by means of the at least one load cell 72, the at least one strain gauge 74 and/or the distance sensor 76. However, the pressure can also be ascertained on a theoretical basis by using previously known geometric data about the first element 56 and about the second element 58, by using a mathematical model in the data processing device 40.

Figure 4:
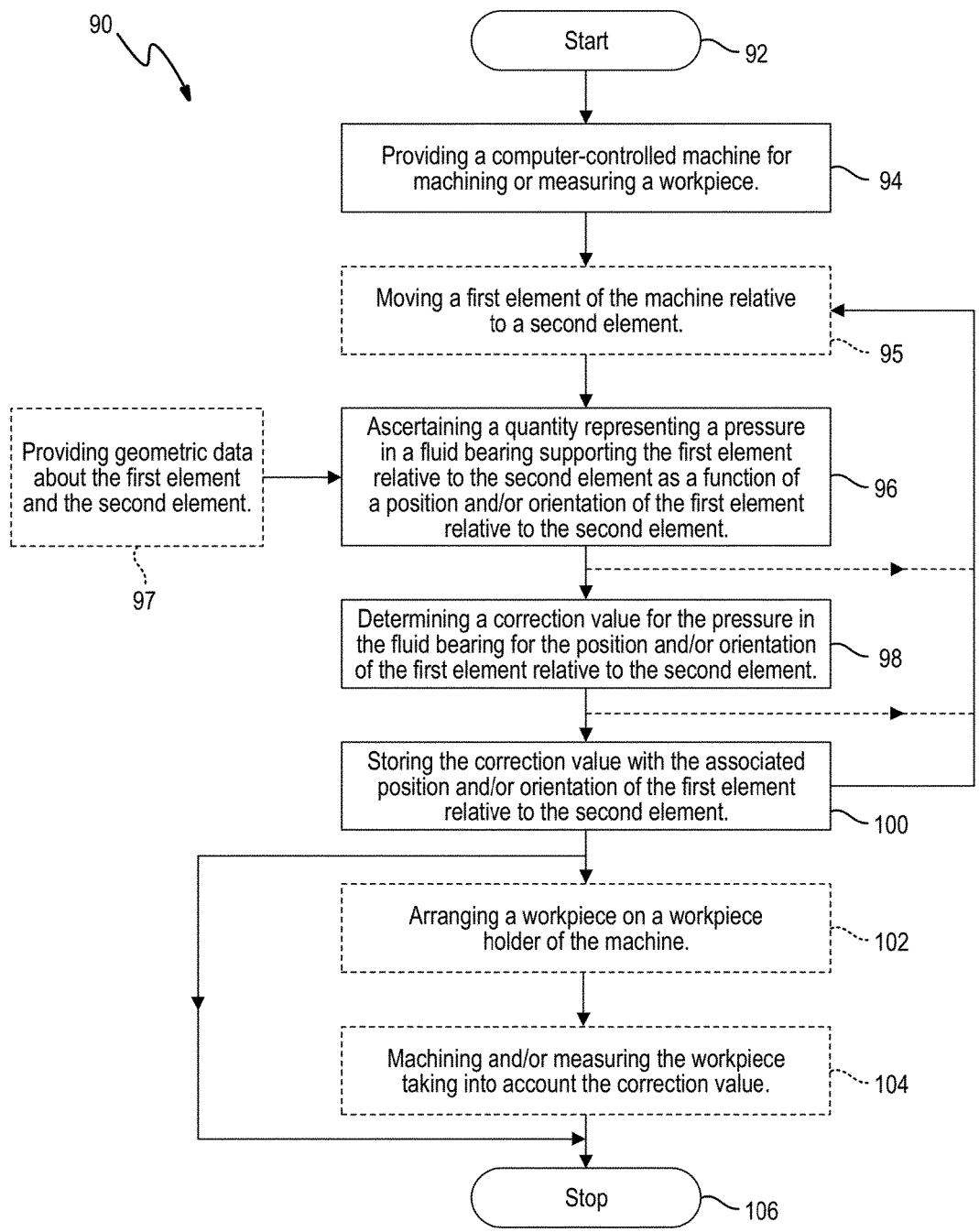
FIG. 4 shows a schematic flow chart of an exemplary embodiment of a method.

A schematic flow chart of one embodiment of a method 90 is illustrated in FIG. 4.

The method begins in a step 92. Firstly, in step 94, provision of the machine 10 for machining or measuring the workpiece 32 is shown, comprising the first element 56 and the second element 58, wherein the first element 56 has the first bearing surface 57 and the second element 58 has the second bearing surface 59. The first bearing surface 57 or the first element 56 and the second bearing surface 59 or the second element 58 are supported against each other by means of the at least one fluid bearing 35. Furthermore, the control device 38 for controlling the machine 10 is provided.

Provision can then firstly be made to move the first element 56 and the second element 58 relative to each other in a step 95. However, it is not absolutely necessary to execute this step during a first performance at the start of the method.

In particular, provision is made, within the context of the step 95, which can be carried out many times, for the entire range of movement of the first element 56 and of the second element 58 to be run through successively. Alternatively, provision can also be made for the entire range of movement to be run through continuously, the pressure in the fluid bearing 35 being ascertained continuously.

In a step 96, a quantity representing a pressure in the at least one fluid bearing 35 is then ascertained as a function of a position and/or orientation of the first element 56 relative to the second element 58.

This ascertainment step can actually be carried out by using sensor data, the sensor data ascertaining the quantity representing the pressure. Here, this can both be the pressure itself and also a quantity representing the pressure indirectly, such as, for example, the width of the fluid bearing gap 70.

Provision can also be made, in a step 97, for geometric data about the first element 56 and about the second element 58 to be detected. In step 96, the pressure to be expected in the corresponding relative position and/or orientation of the first element 56 in relation to the second element 58 can then be ascertained by using a mathematical model based on the geometric data about the first element 56 and the second element 58. This geometric data can have been determined in advance within the context of the step 97, for example within the context of quality assurance. In this case, running through the range of movement, in particular successively, in one or more steps 95 is not necessary.

In a step 98, now the determination of a correction value for a pressure in the at least one fluid bearing 35 for the position and/or orientation of the first element 56 relative to the second element 58 is conducted.

This correction value, with the associated position and/or orientation of the first element 56 relative to the second element 58, is then stored in the control device in a step 100.

A continuation can then be made with the movement step 95 until the entire range of movement of the first element 56 relative to the second element 58 has been run through. In principle, provision can also be made for the storage step 100 and/or the determination step 98 to be carried out only once and for the movement step 95 already to be carried out following the determination step 98 or the ascertainment step 96.

The method can then end in a step 106.

However, provision can also be made, in a step 102, for the workpiece 32 to be arranged on a workpiece holder 29 of the machine 10 and then for the workpiece 32 to be machined or measured while taking into account the correction value or the at least one correction value in a step 104. For each position and/or orientation of the first element 56 relative to the second element 58 which has been occupied within the context of a movement in the step 95, a correction value is stored in the control device within the context of a step 100 and can then be retrieved during the step 104, and the monitoring of the bearing can thus be corrected.

The method then ends again in a step 106.

What is claimed is:

1. A method for ascertaining a correction value for monitoring a fluid bearing of a machine for machining or measuring a workpiece, comprising the following steps:
providing the machine having a first element and a second element which are supported against each other by means of at least one fluid bearing, and having a control device for controlling the machine;
ascertaining a quantity representing a pressure in the at least one fluid bearing as a function of a position and/or orientation of the first element relative to the second element;
determining a correction value for a pressure in the at least one fluid bearing for the position and/or orientation of the first element relative to the second element, by determining from the pressure represented by the quantity a pressure fluctuation as the correction value in a location-dependent and/or orientation-dependent manner; and
storing the correction value in the control device.

2. The method as claimed in claim 1, wherein the ascertainment step is carried out for a multitude of positions and/or orientations of the first element relative to the second element, such that a corresponding multitude of position and/or orientation specific correction values are stored.

3. The method as claimed in claim 2, wherein the multitude of positions and/or orientations covers an entire range of a relative movement between the first element and the second element in discrete steps.

4. The method as claimed in claim 3, wherein the first element and the second element are each an element of a workpiece holder for holding a workpiece.

5. The method as claimed in claim 4, wherein the first element is a rotary table or a rotor of the rotary table and the second element is a base on which the rotary table is supported or a stator of the rotary table.

6. The method as claimed in claim 1, wherein the machine has multiple fluid bearings, the ascertainment, determination and storage steps being carried out for each of the fluid bearings.

7. The method as claimed in claim 1, wherein the first element and the second element are each an element of a machine frame of the machine, a working head of the machine being arranged on the machine frame.

8. The method as claimed in claim 1, wherein, before each ascertainment step, a step of moving the first element and the second element relative to each other is carried out in such a way that a position and/or an orientation of the first element relative to the second element changes.

9. The method as claimed in claim 8, wherein the movement of the first element relative to the second element is carried out step by step, the position and/or the orientation of the first element and the second element relative to each other not changing during the ascertainment step.

10. The method as claimed in claim 8, wherein the movement of the first element relative to the second element is carried out continuously, the position and/or the orientation of the first element and the second element relative to each other changing during the ascertainment step.

11. The method as claimed in claim 4, wherein the ascertainment, determination and storage steps are carried out without the workpiece being arranged on the workpiece holder.

12. The method as claimed in claim 4, further comprises the following steps:
arranging the workpiece on the workpiece holder of the machine; and
machining or measuring the workpiece while taking into account the correction values associated with the various positions and/or orientations of the workpiece holder during the machining or measuring process.

13. The method as claimed in claim 1, wherein the ascertainment step is carried out by the pressure being ascertained directly by means of a pressure sensor.

14. The method as claimed in claim 1, wherein the ascertainment step is carried out by the pressure being ascertained indirectly via a deformation of the first and/or of the second element, detected by means of at least one strain gauge or at least one load cell, or by the pressure being ascertained indirectly via a fluid bearing gap width between the first element and the second element, detected by means of a distance sensor.

15. The method as claimed in claim 1, wherein the ascertainment step is carried out in that, by using predetermined geometric data about the first element and the second element, an expected pressure change in the fluid bearing is calculated as a function of a position and/or orientation of the first element relative to the second element.

16. The method as claimed in claim 1, wherein the fluid bearing is an air bearing.

17. A machine for machining and/or measuring a workpiece, having a first element and a second element, the first element and the second element being supported against each other by means of at least one fluid bearing, having a pressure ascertaining device for ascertaining a quantity representing a pressure in the at least one fluid bearing, and having a control device for controlling the machine, wherein the pressure ascertaining device is designed to ascertain a quantity representing the pressure in the at least one fluid bearing as a function of a position and/or orientation of the first element relative to the second element and to output said quantity as a correction value to the control device.

18. The machine as claimed in claim 17, wherein the first element is a rotary table, and the second element is a base on which the rotary table is supported.

19. The machine as claimed in claim 17, wherein the machine has multiple fluid bearings.

20. The machine as claimed in claim 17, wherein the pressure ascertaining device has at least one sensor device respectively assigned to a fluid bearing, the sensor device detecting a quantity representing a pressure in the respective fluid bearing.

21. The machine as claimed in claim 20, wherein the at least one sensor device is in each case a pressure sensor or a least one strain gauge or at least one load cell or a distance sensor for detecting a fluid bearing gap width between the first element and the second element.

22. The machine as claimed in claim 17, wherein the pressure ascertaining device is a data processing device, which is equipped in such a way that, by using geometric data, the pressure ascertaining device ascertains a pressure change to be expected in the fluid bearing.

23. The machine as claimed in claim 17, wherein the fluid bearing is an air bearing.

24. The machine according to claim 19, wherein the multiple fluid bearings are arranged in the form of a ring with respectively equal distances from adjacent fluid bearings.

* * * * *